Aug. 9, 1927.

S. M. GAGNON 1,638,300

LOCKING DEVICE

Filed June 20, 1922

Inventor.
Samuel M. Gagnon
by J. H. McCready
his Atty.

Patented Aug. 9, 1927.

1,638,300

UNITED STATES PATENT OFFICE.

SAMUELL M. GAGNON, OF LOWELL, MASSACHUSETTS, ASSIGNOR TO SACO-LOWELL SHOPS, OF BOSTON, MASSACHUSETTS, A CORPORATION OF MASSACHUSETTS.

LOCKING DEVICE.

Application filed June 20, 1922. Serial No. 569,765.

The operating mechanism for gill boxes of the character used in the worsted industry includes cams for transferring the fallers from the return screws to the operating screws. It is necessary to remove the cams occasionally for replacement or repair, and it has therefore been proposed heretofore to make the cam carrying disk in two parts so that it could be removed more conveniently from the shaft on which it is mounted. The use of a split disk of this character requires some form of locking means for holding the split sections together, and the means heretofore employed for this purpose has given trouble because of its tendency to become loosened, apparently due to the vibration to which it is subjected in the machine.

The present invention aims to devise an improved form of locking means which will overcome this objection. While the locking device provided by this invention is of particular utility for the purpose just mentioned, it is also contemplated that it can be used to advantage in many other relationships.

The nature of the invention will be readily understood from the following description when read in connection with the accompanying drawings, and the novel features will be particularly pointed out in the appended claims.

Referring now to the drawings.

Figure 1:
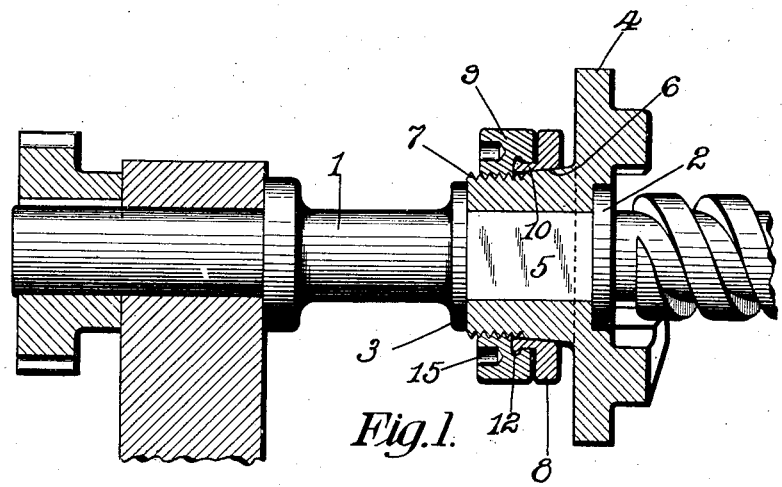
Figure 1 is a view partly in side elevation and partly in vertical cross section of a screw shaft for a gill box constructed in accordance with this invention.
Figure 2:
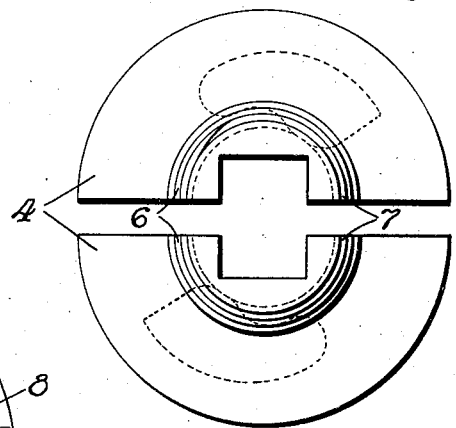
Fig. 2 is an end view of the split cam carrying disk shown in Fig. 1.

In the construction shown the screw shaft 1 is provided with flanges 2 and 3 between which the split cam carrying disk 4 is mounted. The portion 5 of the shaft between the flanges 2 and 3 is made square in cross section, and the disk 4 has a square hole therethrough to fit the portion 5. The cam carrying disk also includes a hub having a tapered portion 6 and a screw threaded portion 7 at the end of said tapered portion.

Figure 4:
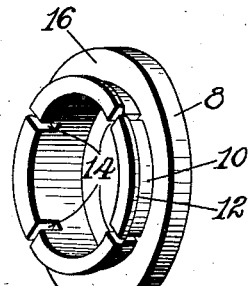
Fig. 4 is a perspective view of one member of the locking device.

The locking device shown comprises a collar 8, internally tapered to fit the tapered surface 6, and a nut 9 which is internally threaded to fit the threaded portion 7. These two parts are connected in a manner which enables them to have a relative rotative movement but prevents any substantial relative axial displacement between them. For this purpose the collar 8 is provided with a circular extension or flange 10, on the end of which is formed a peripheral bead 12; and this flange is slotted at several points, as indicated at 14, Fig. 4, to increase its resiliency for purposes of assembling. A recess or seat, complemental in shape to the flange 10 and head 12, is formed in the end of the nut 9 adjacent to the collar 8, suitable clearances only being provided between the seat and the flange and bead. The nut and collar are assembled in the relationship shown in Fig. 1 by placing the two parts in a press and forcing the flange and bead into the seat formed for them in the nut 9, the flange springing sufficiently to permit this action. The end of the nut 9 opposite the collar 8 is drilled at several points, as indicated at 15, forming holes to receive a spanner wrench.

Figure 3:
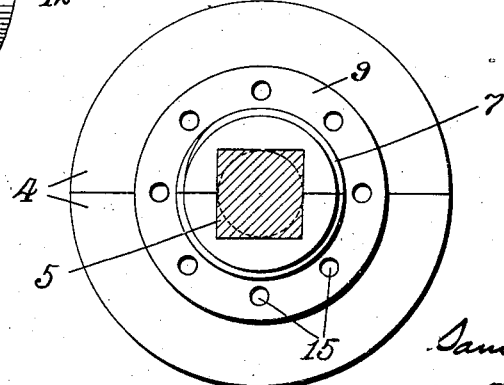
Fig. 3 is a transverse cross sectional view taken at the left-hand end, Fig. 1, of the hub of the cam carrying disk, showing the disk and the locking device in elevation.

In using the device the two sections of the disk 4 are assembled on the shaft, as shown in Figs. 1 and 3, and the nut 9 is then threaded on the section 7 of the hub, thus forcing the collar 8 securely on the tapered part 6 of the hub. This binds the two split portions of the hub securely together. The taper of the surface 6 is made very gradual so that the collar will stick on the hub. When the collar can be crowded on the hub no further, the continued rotative movement of the nut 9 relatively to the collar causes the nut to bind against the adjacent face 16 of the collar and against the threads 7 on the hub. This binding action is so great that there is practically no danger of the nut becoming loosened accidentally; but even if the nut should start to back off, it could not turn far before it would be stopped by its connection with the collar, this connection preventing any substantial axial displacement between the collar and the nut. In other words, the collar is stuck so hard on the tapered portion of the hub that a great deal of force is required to loosen it, and this fact, together with the nature of the connection between the collar and the nut, makes it impossible for the nut to back off accidentally.

When it is desired to remove the cam disk 4 the operations above described are reversed. That is, the nut 9 is backed off, and, due to the nature of the connection between the nut and the collar, this backing off action also draws the collar off the tapered surface of the hub. The two parts of the disk 4 can then be removed from the shaft and new parts substituted for them.

It will now be appreciated that the invention provides a very simple form of locking device which not only avoids any liability of becoming loosened, but which also ensures the ready removal of the device whenever necessary and prevents any trouble that otherwise might be experienced with the sticking of the collar on the hub. The fact that the device is very neat and compact is also of advantage in the particular location above mentioned since the space within which a mechanic must work in applying or removing it is very limited.

Having thus described my invention, what I desire to claim as new is:

1. A locking device of the character described comprising a nut, a collar positioned beside said nut, the bore of the collar beyond the end of the nut being tapered, and means at the adjacent ends of the nut and collar connecting said nut and collar together and holding them against substantial relative axial displacement but permitting a relative rotative movement between them.

2. A locking device of the character described comprising a nut and a collar positioned immediately beside said nut, the bore of the collar beyond the end of the nut being tapered, one of said parts at said end of the nut having a circular flange extending therefrom parallel to the axis of said part, said flange being provided with a peripheral bead near its outer end, the other of said parts having a seat therein to receive said flange and bead, whereby said nut and collar are held together against substantial displacement axially thereof but are enabled to have a relative rotative movement.

3. A locking device of the character described comprising a nut and an internally tapered collar positioned immediately beside said nut, said collar and nut having surfaces substantially perpendicular to their axes adapted to bind when axial movement of the collar is stopped and the nut is turned to tighten it, one of said parts having a circular flange extending therefrom parallel to its axis, said flange being provided with a peripheral bead near its outer end and being slotted to enable it to yield, and the other of said parts having a seat therein to receive said flange and bead, whereby said nut and collar are held together against substantial displacement axially thereof but are enabled to have a relative rotative movement.

4. A mechanism of the character described comprising the combination with a member having a threaded portion and a tapered portion adjacent thereto, of a collar tapered to fit on said tapered portion, a nut internally threaded to receive said threaded portion, and a connection between said nut and collar holding them against substantial relative axial displacement but permitting a relative rotative movement between them.

5. A mechanism of the character described comprising the combination with a member having a threaded portion and a tapered portion adjacent thereto, of a collar tapered to fit on said tapered portion, a nut internally threaded to receive said threaded portion, said collar having a surface against which said nut binds when the axial movement of the collar is stopped by its engagement with said tapered portion, and a connection between said nut and collar holding them against substantial relative axial displacement but permitting a relative rotative movement between them.

6. A mechanism of the character described comprising the combination with a member having a threaded portion and a tapered portion adjacent thereto, of a collar tapered to fit on said tapered portion, a nut internally threaded to receive said threaded portion, said collar having a surface against which said nut binds when the axial movement of the collar is stopped by its engagement with said tapered portion, said collar having a circular flange extending therefrom parallel to its axis, said flange being provided with a peripheral bead, and said nut having a seat therein to receive said flange and bead.

7. An apparatus of the character described comprising, in combination, a shaft, a split cam carrying member embracing said shaft and having a hub comprising a tapered portion and a threaded portion adjacent to said tapered portion, a collar internally tapered to fit the tapered portion of said hub, a nut threaded on the threaded portion of said hub, and a connection between said nut and collar holding them closely together and preventing substantial axial displacement between them but enabling them to have a relative rotative movement.

8. An apparatus of the character described comprising, in combination, a shaft, a split cam carrying member embracing said shaft and having a hub comprising a tapered portion and a threaded portion adjacent to said tapered portion, a collar internally tapered to fit the tapered portion of said hub, a nut threaded on the threaded portion of said hub, and a connection between said nut and collar holding them against substantial relative axial displacement but permitting a relative rotative movement between them.

SAMUELL M. GAGNON.